J. J. FAULKNER.
CULTIVATOR.
No. 192,060.  Patented June 19, 1877.
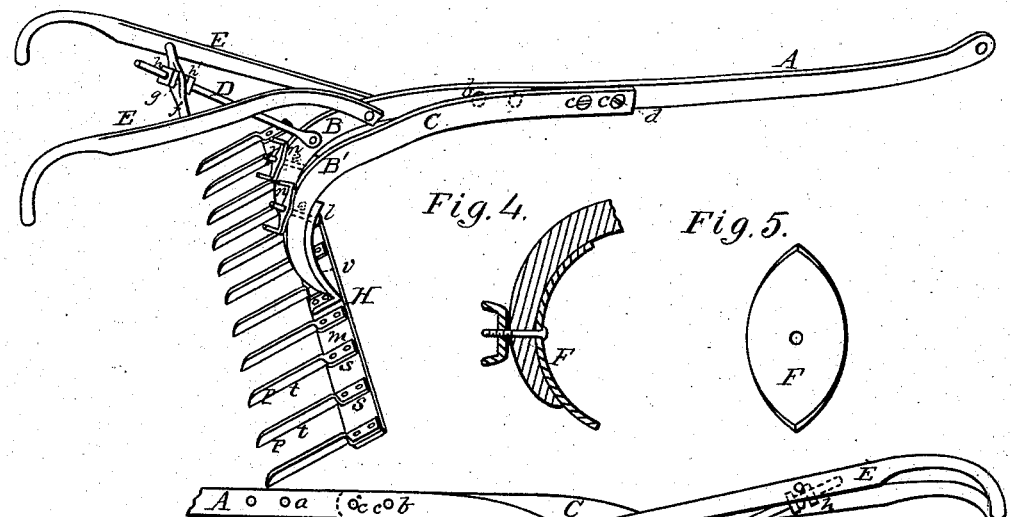
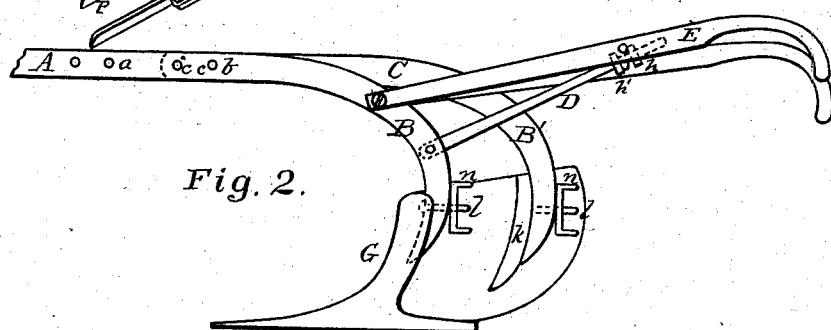
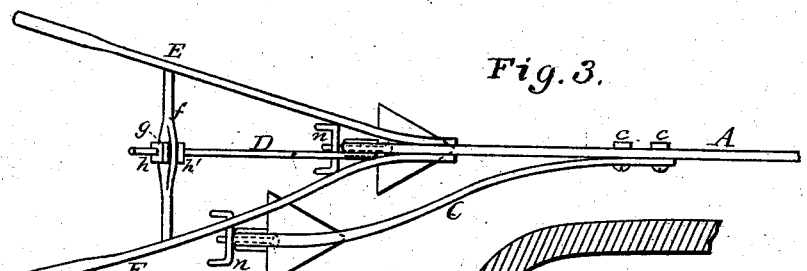
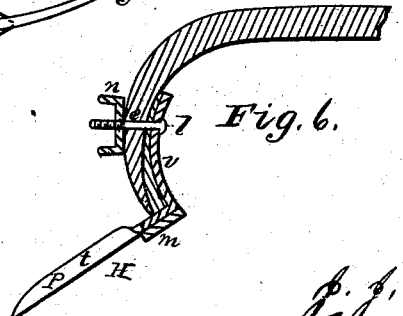
WITNESSES
Villette Anderson
W. E. Mass
INVENTOR
J. J. Faulkner
by E. W. Anderson,
ATTORNEY

UNITED STATES PATENT OFFICE.

JAMES J. FAULKNER, OF LOUISVILLE, KENTUCKY.

IMPROVEMENT IN CULTIVATORS.

Specification forming part of Letters Patent No. 192,060, dated June 19, 1877; application filed September 30, 1876.

*To all whom it may concern:*

Be it known that I, JAMES J. FAULKNER, of Louisville, in the county of Jefferson and State of Kentucky, have invented a new and valuable Improvement in Harrows or Clod-Cutters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of this invention. Fig. 2 is a side view of the same. Fig. 3 is a top view, and Figs. 4, 5, and 6 are details.

This invention has relation to agricultural implements of that class wherein the blade portions or parts, which work in the ground, are interchangeable with reference to the draft-frame; and it consists in a main beam having a curved rear standard and two sets of perforations, the one in rear of the other, in combination with a branch beam having a single set of perforations, whereby means are provided for longitudinally adjusting the branch beam relative to the main beam, and the whole adapted to receive either a turn-plow, cultivator-shovels, or a clod-cutter, as hereinafter shown and described.

In the accompanying drawings, the letter A designates the main draft-beam, which is curved downward in rear to form a concave standard or arm, B. Two sets of perforations, $a$ and $b$, are provided, one in rear of the other, through the horizontal portion of this beam. Each set consists of two perforations at least. C represents the adjustable side beam or branch. This is provided with a curved rear standard, B', similar to that of the main beam. This branch is capable of adjustment in two positions, in one of which its curved rear portion is even with that of the main beam. In this case it is secured to the main beam by bolts $c$ passing through the forward set $a$ of perforations. In the other adjustment the side beam is dropped back, so that its curved arm is in rear of that of the main beam. In this case the branch beam is secured to the main beam by bolts passing through the rear set $b$ of perforations, the set $d$ of perforations at the end of the branch corresponding to either set of the main beam. When the branch is bolted to the main beam it will preserve a rigid relation thereto, the adjustment being fixed for this purpose by the use of two bolts. Through the curved arms B B' are holes $e$ extending from front to rear, and located sufficiently above the ends of the arms to allow the latter to have a strong bracing action below said holes when the working parts are attached.

To the upper part of the bend of the main beam are pivoted the ends of the handles E, which are connected at about their middle portions by a centrally-perforated transverse bar, $f$. D is a brace-rod, pivoted to the curved arm of the main beam below the point of attachment of the handles, and extending in rear through the perforation $g$ of the bar $f$. This portion of the rod D, which is adjustable through the bar $f$, is threaded for the engagement of two nuts, $h$ and $h'$, which are respectively arranged on the outer and inner sides of the bar $f$, and serve in connection therewith to secure the adjustment of the brace-rod and the handles, enabling the latter to be fixed at any desired height. The handles, being pivoted to the curve of the main beam, well in rear of the point of attachment of the branch, are comparatively light and of short radial sweep, so that a few turns of the nuts on the rods will effect an important difference in their height. The brace-rod is extended to the rear cross-bar between the handles, so as to be within easy reach of the operator.

For the attachment of the cultivating-blades F the branch beam C may be adjusted abreast of the main beam or in rear thereof. When in the latter position the frame is ready for the attachment of the turning-plow G, which should be provided with a rib, $k$, on the rear surface of the mold-board, to serve as a bearing for the curved arm of the side beam. These blades are designed to be secured to the curved standards by means of bolts $l$, which pass through apertures in the blades and the holes $e$ of said standards, and are secured in rear by lever-nuts $n$. H designates the clod-cutter. This consists of a transverse bar, $m$, to the rear surface of which are bolted the flat shanks $s$ of the teeth or knives $t$, the blades $p$ of which have their breadth at right angles to that of the flat shanks, as shown in the drawings. Hence, when these shanks are secured to the bar $m$ the blades will be placed edge forward, and in position to operate advantageously upon the clods and hardened soil.

To the bar $m$ are also attached curved arms $v$, which extend upward with a backward concave curvature corresponding to that of the curved rear ends of the beams. These arms are designed to be bolted to the fronts of the curved arms B B' by means of the bolts and lever-nuts above referred to. In order to give the blades of the harrow or clod-cutter more depth in the ground when required, a transverse wooden wedge, $w$, is introduced between the arms $v$ and the standards B B' before the former are bolted to the latter.

This forms a convenient agricultural implement of simple construction and sufficient strength. Its handles can be readily adjusted to suit the different working parts or to accommodate persons of different heights. With the same frame the ground can be turned, the clods broken up, and the surface of the soil leveled, and cultivating to a great extent accomplished.

I am aware that it is not new to pivot a branch beam to the main beam of a cultivator at different points; to employ a threaded rod and lock-nuts to adjust the handles at different heights; or to employ edge-cutting teeth in clod-crushers. Hence I do not broadly claim such devices.

What I claim as my invention, and desire to secure by Letters Patent, is—

1. The main beam A, having the curved rear arm B and two sets of perforations, the one in rear of the other, in combination with the branch beam C, having a single set of perforations, whereby the branch beam is adjustable longitudinally, and the whole adapted to receive either a turn-plow, cultivator-shovels, or a clod-cutter, substantially as and for the purpose described.

2. The combination of the main beam A, having a curved standard, B, the longitudinally-adjustable branch beam C, having a like standard, B', the harrow-beam $m$, provided with spaced teeth $t$, having their shanks at right angles to their cutting-blades, and the curved arms $v$, corresponding to the curvature of the standards B B', substantially as specified, and for the purpose set forth.

In testimony that I claim the above I have hereunto subscribed my name in the presence of two witnesses.

J. J. FAULKNER.

Witnesses:
 E. B. WINTERBOURN,
 D. M. RODMAN.